US009294733B2

(12) United States Patent
Watanabe et al.

(10) Patent No.: US 9,294,733 B2
(45) Date of Patent: Mar. 22, 2016

(54) DRIVING ASSIST APPARATUS

(75) Inventors: Kazuya Watanabe, Anjo (JP); Akira Someya, Kariya (JP); Norichika Yamashita, Kariya (JP); Masahito Nito, Aichi-gun (JP); Yoshinobu Uchiyama, Kariya (JP); Daisuke Sugiura, Kariya (JP)

(73) Assignee: AISIN SEIKI KABUSHIKI KAISHA, Aichi-ken (JP)

( * ) Notice: Subject to any disclaimer, the term of this patent is extended or adjusted under 35 U.S.C. 154(b) by 379 days.

(21) Appl. No.: 13/817,670

(22) PCT Filed: May 6, 2011

(86) PCT No.: PCT/JP2011/060597
§ 371 (c)(1),
(2), (4) Date: Feb. 19, 2013

(87) PCT Pub. No.: WO2012/032809
PCT Pub. Date: Mar. 15, 2012

(65) Prior Publication Data
US 2013/0147945 A1 Jun. 13, 2013

(30) Foreign Application Priority Data
Sep. 6, 2010 (JP) .................................. 2010-198789

(51) Int. Cl.
H04N 7/18 (2006.01)
B62D 15/02 (2006.01)

(52) U.S. Cl.
CPC .............. *H04N 7/18* (2013.01); *B62D 15/0295* (2013.01)

(58) Field of Classification Search
CPC ........... B62D 15/0275; B62D 15/0295; B60R 2300/305; B60R 2300/806; B60R 2300/302; B60R 2300/8086; B60R 2300/301; B60R 2300/8066; B60K 2350/1088; G06T 2207/30264; H04N 7/18
See application file for complete search history.

(56) References Cited

U.S. PATENT DOCUMENTS

2006/0209188 A1* 9/2006 Mizusawa .......... B62D 15/0295
348/148
2009/0050997 A1* 2/2009 Mutoh .............. H01L 27/14609
257/440
2010/0238051 A1* 9/2010 Suzuki ..................... B60R 1/00
340/932.2

FOREIGN PATENT DOCUMENTS

CN          101816175 A      8/2010
JP          11-334470 A     12/1999
(Continued)

OTHER PUBLICATIONS

English Translation of International Preliminary Report on Patentability for PCT/JP2011/060597 dated Mar. 14, 2013.
Chinese Office Action, dated Nov. 4, 2014, issued in counterpart Chinese Patent Application No. 201180041923.6.
International Search Report dated Aug. 9, 2011, issued in International Application No. PCT/JP2011/060597.
Notification of International Preliminary Report of Patentability issued by the International Prelminary Examining Authority, dated Jan. 8, 2013, issued in International Application No. PCT/JP2011/060597.

(Continued)

Primary Examiner — Andy Rao
Assistant Examiner — Obafemi Sosanya
(74) Attorney, Agent, or Firm — Sughrue Mion, PLLC

(57) ABSTRACT

Provided is a driving assist apparatus that eases the driver's operational burden by superimposing a guide image on an image captured by a vehicle-mounted camera, with a simple system configuration. A captured image of the periphery of the vehicle captured by the vehicle-mounted camera is displayed on a display apparatus inside the vehicle as a display image superimposed with a guide image using a guide display, which is a graphics image containing a guide line. Predicted course lines, which are guide lines indicating predicted courses according to an actual steering angle of the vehicle in the captured image, are stored as a plurality of graphics images that have been generated in advance for every predetermined steering angle, in a storage portion that stores graphics images for forming guide displays. A graphics image of a predicted course line is acquired from the storage portion according to the actual steering angle of the vehicle, and is provided as a guide image.

20 Claims, 8 Drawing Sheets

(56) References Cited

FOREIGN PATENT DOCUMENTS

| | | |
|---|---|---|
| JP | 2004-203365 A | 7/2004 |
| JP | 2005-056320 A | 3/2005 |
| JP | 2005-077107 A | 3/2005 |
| JP | 2006-216066 A | 8/2006 |
| JP | 2008-131250 A | 6/2008 |
| JP | 2010-087743 A | 4/2010 |
| WO | 2009/144893 A1 | 12/2009 |

OTHER PUBLICATIONS

Written Opinion of Preliminary Report issued by the International Prelminary Examining Authority, dated Oct. 2, 2012, issued in International Application No. PCT/JP2011/060597.

Written Opinion of the International Search Authority dated Aug. 9, 2011, issued in International Application No. PCT/JP2011/060597.

* cited by examiner

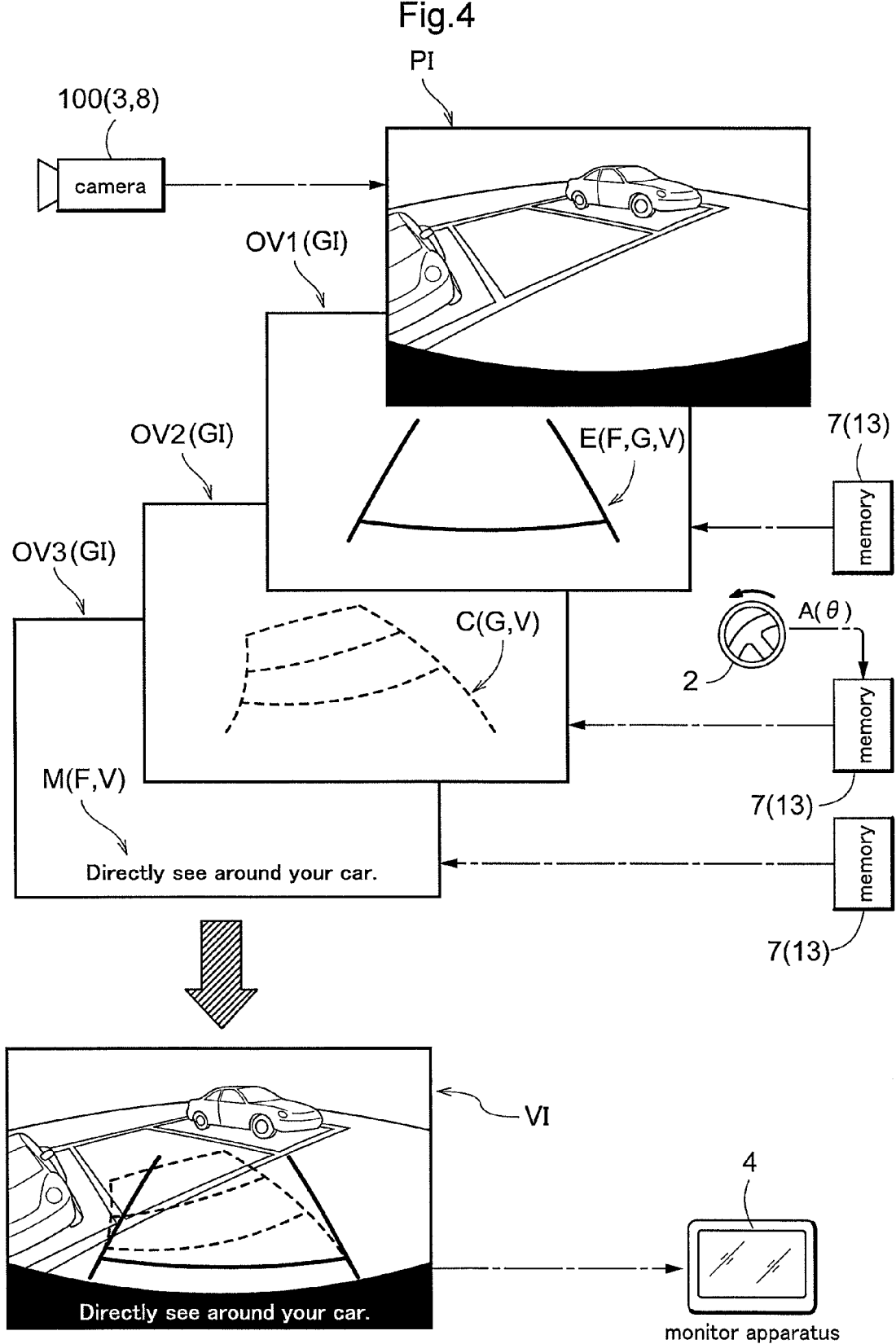

DRIVING ASSIST APPARATUS

CROSS REFERENCE TO RELATED APPLICATIONS

This application is a National Stage of International Application No. PCT/JP2011/060597 filed May 6, 2011, claiming priority based on Japanese Patent Application No. 2010-198789, filed Sep. 6, 2010, the contents of all of which are incorporated herein by reference in their entirety

TECHNICAL FIELD

The present invention relates to a driving assist apparatus that assists driving by superimposing a guide image on an image captured by a vehicle-mounted camera.

BACKGROUND ART

Driving assist apparatuses have been put into practice for easing the driver's operational burden during parking of a vehicle or other occasions requiring a skillful driving operation. JP H11-334470A (Patent Document 1) has disclosed, as an example of such a driving assist apparatus, a parking assist apparatus for appropriately providing information useful when parking a vehicle. This parking assist apparatus obtains a predicted traveling trajectory of the vehicle based on a steering angle, and superimposes this predicted traveling trajectory on a background image. The predicted traveling trajectory is obtained based on a relative equation between a steering angle, a wheelbase of the vehicle, and a turning radius. The predicted traveling trajectory is subjected to coordinate transformation based on a mapping correspondence between a coordinate system (X,Y) of a road and a coordinate system (x, y) on a display of a monitor apparatus, and is superimposed on a background image (Patent Document 1: Paragraphs 27 to 29, FIGS. 8 to 12, etc.).

CITATION LIST

Patent Document

Patent Document 1: JP H11-334470A

SUMMARY OF INVENTION

Technical Problem

Such computation is performed using a CPU as the core, as shown in FIG. 1 of Patent Document 1. That is to say, an image processing apparatus capable of performing this sort of relatively high-level computation is required between a camera apparatus, provided with an optical system including an image sensor and a signal processing circuit, and a monitor apparatus. Furthermore, if the computational performance of the CPU is low, the predicted traveling trajectory is rendered at a low speed, and may not be displayed smoothly in conjunction with the steering angle. Meanwhile, the number of electrical devices mounted in a vehicle tends to increase, and there is an increasing demand in the market for suppression of the electrical power consumption in the entire vehicle and reduction of the cost of the electrical devices.

In view of the above-described background, there is a demand for easing the driver's operational burden by superimposing a guide image on an image captured by a vehicle-mounted camera, with a simple system configuration.

Solution to Problem

In view of the above-described problem, the present invention is directed to a driving assist apparatus, including: an image receiving portion that receives a captured image of a periphery of a vehicle, captured by a vehicle-mounted camera; an image output portion that displays, on a display apparatus inside the vehicle, a display image formed by superimposing a guide image on the captured image, the guide image being configured by a guide display using a graphics image containing a guide line for assisting a driver with a driving operation of the vehicle; a storage portion that stores, as the guide display, at least a plurality of predicted course lines that have been generated in advance as graphics images for every predetermined steering angle, the predicted course lines each being the guide line for assisting the driving operation by showing a predicted course according to an actual steering angle of the vehicle in the captured image; and a guide image providing portion that at least acquires the predicted course line as the guide display from the storage portion according to an actual steering angle of the vehicle using offset values on respective two axes in a two-dimensional orthogonal coordinate system, forms the guide image using the acquired guide display, and provides the formed image to the image output portion, the offset values on the respective two axes in the two-dimensional orthogonal coordinate system being computed based on a difference between actual coordinate values in the captured image and ideal coordinate values, the difference being obtained based on a rotation parameter of the vehicle-mounted camera according to an attachment position of the vehicle-mounted camera.

With this configuration, instead of the coordinates of a predicted course line in a captured image being computed and rendered according to the steering angle of the vehicle, the predicted course line that has been generated in advance according to the steering angle and stored in the storage portion is acquired according to the actual steering angle. Accordingly, the guide image with the predicted course line can be obtained simply using the steering angle as an argument, without requiring complicated computation. Furthermore, the predicted course line can be added to the captured image by superimposing the guide image with the predicted course line on the captured image, without requiring complicated computation. As a result, it is possible to ease the driver's operational burden by superimposing a guide image on an image captured by a vehicle-mounted camera, with a simple system configuration.

Preferably, the guide image providing portion acquires the guide display from the storage portion in synchronization with a capture cycle of the captured image or an update cycle of the display image on the display apparatus, and provides the guide image to the image output portion. For example, as an exemplary synchronization, if the guide image is provided to the image output portion in the same cycle as the update cycle of the display image, the image output portion can obtain a new guide image in each update cycle of the display image. If the captured image is used substantially as it is as the base of the display image, the guide image changes at the same speed as the captured image captured by the vehicle-mounted camera. Accordingly, in spite of a simple configuration with significantly reduced computation load, it is possible to provide visual effects completely similar to those in the case where the guide display generated by computation is directly rendered in the captured image and formed into a display image. Note that, if the change of the guide display is to be performed without any problem at a speed lower than the frame rate of the captured image or the display image, the guide image may be provided in the cycle that is an integral multiple of the update cycle of the display image. Also in this case, there is no change in terms of being in synchronization with the update cycle of the display image. If the guide image is provided in synchronization with the update cycle of the display image, good display images can be displayed on the display apparatus with a reduced sense of unnaturalness. It will be appreciated that the synchronization also includes irregular cases in which, for example, the guide images are provided in the cycle that is twice the update cycle of the display image, then in the cycle that is three times, and then in the cycle that is twice, that is, two guide images are provided on the whole in the cycle that is five times the update cycle. If a video format that can be displayed on the monitor apparatus does not match a video format of the captured image that has been captured by the vehicle-mounted camera, the captured image cannot be displayed on the monitor apparatus. Accordingly, synchronization with the update cycle of the display image is substantially the same as synchronization with the capture cycle of the captured image.

Preferably, an error between ideal coordinates of a reference point in a two-dimensional coordinate system of the captured image and actual coordinates is taken as a position-related error in an optical system occurring when attaching the vehicle-mounted camera to the vehicle, and the guide image providing portion of the driving assist apparatus according to the present invention corrects a position of the guide display in the display image based on a correction parameter for correcting the position-related error in the optical system in the display image. In an actual vehicle, due to the influence of part tolerances, attachment tolerances, or the like, ideal coordinates of a reference point in a two-dimensional coordinate system of the captured image and actual coordinates may not match each other. Since an error in the coordinates of the reference point is offset on a projection plane of the two-dimensional coordinate system, the error can be easily corrected using a correction parameter defining the amount of such offset. That is to say, it is sufficient to merely provide the offset to the coordinate values in the two-dimensional coordinate system without performing complicated computation such as coordinate transformation. With such correction, position-related errors in the optical system can be effortlessly corrected.

Preferably, a rotation angle of the captured image with respect to an ideal state of the captured image is taken as a rotation-related error in an optical system occurring when attaching the vehicle-mounted camera to the vehicle, the storage portion of the driving assist apparatus according to the present invention further stores graphics images showing the guide displays according to a steering angle of the vehicle, according to the rotation-related error in the optical system, and the guide image providing portion acquires the graphics image of the predicted course line from the storage portion according to an actual steering angle of the vehicle and a rotation parameter indicating the rotation-related error in the optical system occurring when attaching the vehicle-mounted camera to the vehicle. In an actual vehicle, due to the influence of part tolerances, attachment tolerances, or the like, an ideal angle of a coordinate axis in a two-dimensional coordinate system of the captured image and an actual angle may not match each other. Since an error in the angle of the coordinate axis is a rotational error in the captured image, coordinate transformation is required to correct this error through reverse rotation. The coordinate transformation imposes a relatively high computation load. Meanwhile, with the configuration of this specification, the storage portion further stores graphics images according to a rotation-related error in the optical system, and the guide image providing portion acquires the graphics image of the predicted course line from the storage portion according to an actual steering angle and a rotation parameter. In this manner, the guide image providing portion can provide the image output portion with a guide image in which the rotation-related error in the optical system has been suppressed, without performing high-load computation such as coordinate transformation, in order to correct a rotation-related error in the optical system.

Preferably, a rotation angle of the captured image with respect to an ideal state of the captured image is taken as a rotation-related error in an optical system occurring when attaching the vehicle-mounted camera to the vehicle, the storage portion stores of the driving assist apparatus according to the present invention the graphics images of the predicted course lines over a variable range that is wider than a variable range of an actual steering angle, and the guide image providing portion corrects an actual value of the steering angle based on an actual steering angle of the vehicle and a rotation parameter indicating the actual rotation-related error in the optical system, and acquires the predicted course line from the storage portion according to the corrected value. As described above, the coordinate transformation imposes relatively high computation load. Meanwhile, with the configuration of this specification, the actual steering angle is corrected based on a rotation parameter, and the predicted course line is acquired from the storage portion according to the corrected steering angle, and, thus, high computation load such as coordinate transformation is not required. Since the storage portion stores the graphics images of the predicted course lines over a variable range that is wider than a variable range of an actual steering angle, the steering angle may be corrected based on the rotation parameter without any problem. In this manner, the guide image providing portion can provide the image output portion with a guide image in which the rotation-related error in the optical system has been suppressed, without performing high-load computation such as coordinate transformation, in order to correct a rotation-related error in the optical system.

Preferably, the graphics images of the predicted course lines stored in the storage portion of the driving assist apparatus according to the present invention are generated such that the predetermined steering angle when a steering wheel of the vehicle is close to a neutral position is smaller than that when the steering wheel has been rotated. With this configuration, the resolution when the steering wheel is close to the neutral position is high, and the predicted course line sensitively follows the steering operation from the neutral position for starting the steering. Accordingly, the driver can be promptly notified of a change in the predicted course line in the display image. As a result, the driver can recognize the movement of the predicted course line at an early stage, and excellent driving assist effects are achieved.

Preferably, in the captured image, the guide display that is displayed at a predetermined position on a display screen regardless of an actual steering angle of the vehicle is taken as a fixed guide, the storage portion of the driving assist apparatus according to the present invention further stores at least one said fixed guide, and the guide image providing portion acquires the predicted course line and the fixed guide from the storage portion, performs merging the same into one said guide image, and provides the guide image to the image output portion. Thus, even if a plurality of types of guide displays are provided, the guide image providing portion merges them into one guide image, and, thus, it is sufficient for the image output portion to superimpose the captured image and the guide image. As a result, the computation load is reduced, and the driving assist apparatus can be realized with a simple system configuration.

Preferably, the fixed guide includes a vehicle extension line as the guide line indicating an extension line of the vehicle in a travel direction at a predetermined steering angle, regardless of an actual steering angle of the vehicle, in the captured image. If the vehicle extension line and the predicted course line are both superimposed as the guide images on the captured image, the driver is easily notified of the relationship between the steering amount and the travel direction.

Preferably, according to an embodiment of the present invention, the driving assist apparatus is configured by an integrated vehicle-mounted camera module including:
an image sensor device provided with
an image sensor core having an image sensor that performs photoelectric conversion to convert a scene in a periphery of the vehicle into an analog image signal, and a signal processing portion that performs signal processing on the analog image signal to generate the captured image composed of a digital image signal, and
an image sensor processor that at least generates the guide image by acquiring the guide display containing the predicted course line from the storage portion, generates the display image by superimposing the captured image and the guide image, and outputs the display image;
an optical unit that forms an image of the scene in the periphery of the vehicle on a light-receiving face of the image sensor; and
a memory that stores the graphics images of the guide displays.

With this configuration, processing that captures the captured image, superimposes the guide image on the captured image, and then outputs the thus obtained display image is comprehensively performed by the integrated vehicle-mounted camera module. That is to say, if a monitor apparatus is installed in the vehicle, the driving assist apparatus can be effortlessly added to the vehicle merely by displaying the display image on the monitor apparatus. Typically, the function of such a driving assist apparatus has to be added during production of vehicles in production plants of manufacturers. However, the driving assist apparatus of the present invention can be added merely by installing a vehicle-mounted camera module in the vehicle and connecting it to a monitor apparatus. Accordingly, it is highly possible that the driving assist apparatus can be added also in maintenance factories of dealers capable of performing simple optical axis adjustment, for example. As a result, the present invention contributes to making the driving assist apparatus widely usable, and can reduce the operational burden of many drivers. Furthermore, since the driving assist apparatus can be realized with a vehicle-mounted camera module configured by a simple computing device, without installing a high-performance computing device in the vehicle, the driving assist apparatus can be added at a low cost.

Preferably, the vehicle is provided with an object detecting portion that detects an object around the vehicle, the storage portion stores a plurality of pieces of surrounding information that have been generated in advance as graphics images respectively for distances and directions from the vehicle to the object, the surrounding information indicating a situation surrounding the vehicle, and the guide image providing portion acquires the surrounding information from the storage portion based on a detection result from the object detecting portion, performs merging the same into the guide image, and provides the guide image to the image output portion. With this configuration, dynamic information from the object detecting portion may be displayed in a guide image different from the guide image of the predicted course line, and the display may be changed only as necessary according to a change in the surrounding situation information, which improves the efficiency.

Furthermore, the surrounding information may be merged in an upper portion in the guide image. The upper portion in the captured image in many cases contains unnecessary scenes such as upper floors of buildings or the sky. Thus, with this configuration, since the surrounding information can be arranged in a region containing unnecessary scenes in the captured image, a region indicating the situation surrounding the vehicle (e.g., a region requiring attention), which is contained in the captured image, is not interrupted.

Alternatively, the surrounding information may be merged in a lower portion in the guide image. The lower portion in the captured image in many cases contains the body of the vehicle. Thus, with this configuration, since the surrounding information can be arranged in a region containing the body of the vehicle in the captured image, a region indicating the situation surrounding the vehicle (e.g., a region requiring attention), which is contained in the captured image, is not interrupted.

BRIEF DESCRIPTION OF DRAWINGS

FIG. 4 is a diagram schematically showing a relationship between a captured image, guide images, and a display image.

DESCRIPTION OF EMBODIMENTS

Figure 1:
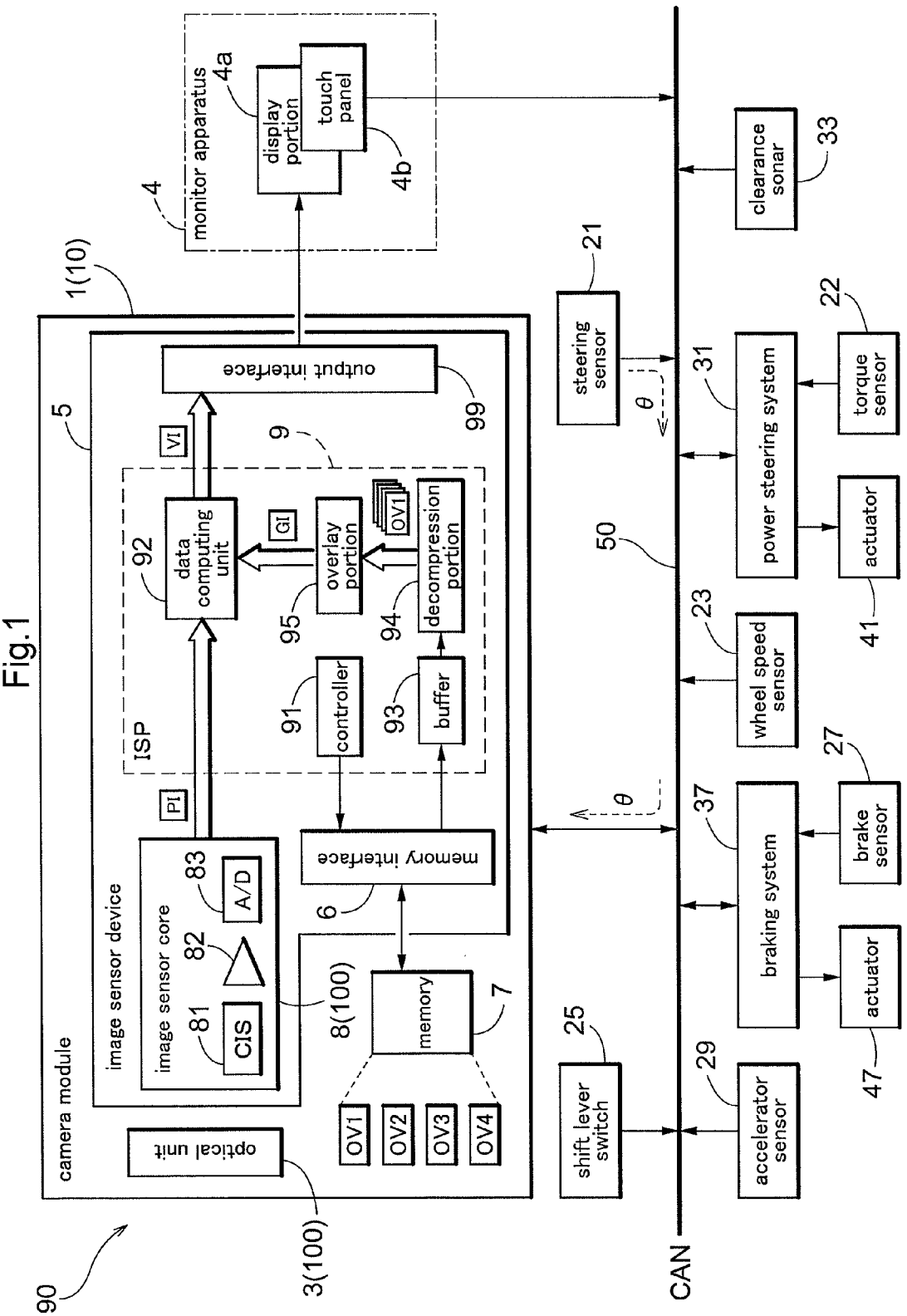
FIG. 1 is a block diagram schematically showing an exemplary system configuration of a vehicle.
Figure 2:
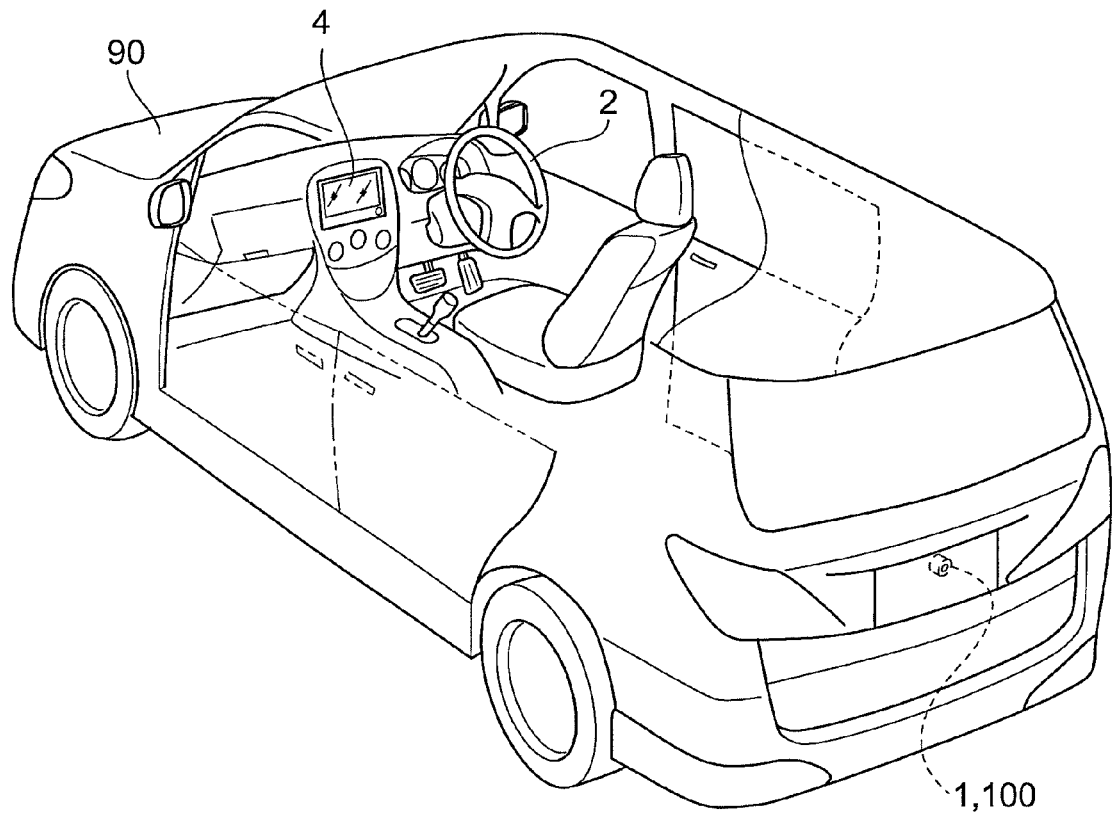
FIG. 2 is a perspective view of the vehicle, with part of the vehicle being cut away.

Hereinafter, embodiments of the present invention will be described with reference to the drawings. As shown in FIGS. 1 and 2, this embodiment will be described using, as an example, a driving assist apparatus (parking assist apparatus or periphery monitoring apparatus) 10 with which a captured image PI of the periphery of a vehicle 90, captured as a moving image by a camera 100 mounted in a vehicle (vehicle-mounted camera), is displayed as a display image VI on a monitor apparatus 4 (display apparatus). The camera 100 is a camera that captures 15 to 30 frames of two-dimensional images per second in a time series using an imaging device such as a CCD (charge coupled device) or a CIS (CMOS image sensor), subjects the images to digital conversion, and outputs moving image data (captured images) in real-time. In this embodiment, the camera 100 is configured as part of a camera module (vehicle-mounted camera module) 1 in which an optical unit 3 including a lens, an optical path, and the like, an image sensor device 5, and a memory 7 have been integrated. Furthermore, the camera module 1 corresponds to the driving assist apparatus 10 of the present invention. The image sensor device 5 is a semiconductor chip on which an image sensor and a signal processing circuit for electrical signals that have been subjected to photoelectric conversion by the image sensor are integrated. In such a semiconductor chip, use of a CMOS process is desirable in view of integration properties, electrical power consumption, and the like. Accordingly, in this embodiment, a CIS is used as the imaging device.

More specifically, the image sensor device 5 is configured including an image sensor core 8, an image sensor processor (ISP) 9, an output interface 99, and a memory interface 6. The image sensor core 8 is configured including a CIS 81 as an image sensor that performs photoelectric conversion to convert scenes in the periphery of the vehicle 90 into analog image signals, and a signal processing portion that performs signal processing on the analog image signals to generate a captured image PI composed of digital image signals. The signal processing portion is configured including an analog signal processing circuit 82 that is configured by an amplifier circuit, a correlated double sampling circuit, or the like, and an A/D converter 83 that converts analog signals into digital signals. The analog signals that have been transmitted via the analog signal processing circuit 82 are converted into digital signals by the A/D converter 83, and, thus, the captured image PI composed of digital image signals is generated.

The camera 100 is configured by the image sensor core 8 and the optical unit 3. The optical unit 3 is configured including a lens and a lens tube (optical path) for preventing ambient light from entering a path from the lens to a light-receiving face of the CIS 81, and forms an image of scenes in the periphery of the vehicle 90 on the light-receiving face of the CIS 81. The lens disposed in the optical unit 3 is a wide-angle lens. In particular, in this embodiment, a field of view that is 140 to 190° in the horizontal direction is ensured. The camera 100 is installed in the vehicle 90 so as to have an angle of depression of approximately 30 degrees relative to the optical axis, and can capture images of a region up to approximately eight meters from the vehicle 90. In other words, the camera module 1 is installed in the vehicle 90 so as to have an angle of depression of approximately 30 degrees relative to the optical axis of the optical unit 3, and the camera 100 can capture images of a region up to approximately eight meters from the vehicle 90. In this embodiment, a back camera that captures images of the area rearward of the vehicle 90 is given as an example of the camera 100, but it may be a camera that captures images of the areas forward of or lateral to the vehicle 90. Furthermore, the number of cameras 100 arranged in the vehicle 90 is not limited to one, and a plurality of cameras may be arranged, for example, in the rear portion and the side portion on the passenger seat side, in the rear portion, the side portion on the passenger seat side, and the front portion, or in the rear portion, both side portions, and the front portion of the vehicle 90.

The captured image PI that has been captured by the camera 100 can be displayed via the ISP 9 on the monitor apparatus 4 (display apparatus) inside the vehicle as the display image VI as shown in FIG. 1. In this embodiment, the ISP 9 is configured by a DSP (digital signal processor) as the core, but may be configured by another arithmetic-logic processor or logic circuit, such as a CPU, as the core. The ISP 9 may perform image processing, for example, for correcting distortion that has occurred during capture by the wide-angle lens, for performing viewpoint conversion, or for adjusting colors. Note that no image processing may be performed by the ISP 9, and the captured image PI may be the same as the display image VI.

In this embodiment, in the ISP 9, a guide image GI is superimposed on the captured image PI, and, thus, the display image VI is formed. As shown in FIG. 4, the guide image GI is an image using a guide display V for assisting the driver with a driving operation of the vehicle 90. The guide display V is a graphics image containing a guide line G or a message M for assisting the driver with a driving operation of the vehicle 90. Furthermore, examples of the guide line G include a predicted course line C that changes according to the steering angle of the vehicle 90, and a vehicle extension line E as a fixed guide F that is rendered at a constant position regardless of the steering angle. It will be appreciated that, if there is no guide display V to be displayed and the guide image GI is transparent, the captured image PI may be the same as the display image VI.

A method for generating the guide image GI will be described later in detail. Various guide displays V are stored in the memory 7. The image sensor device 5 acquires the guide display V from the memory 7 via the memory interface 6, and generates the guide image GI. The memory interface 6 is, for example, an SPI (serial peripheral interface). The image sensor device 5 superimposes the guide image GI on the captured image PI, thereby generating the display image VI, and then outputs the display image VI via the output interface 99 to the monitor apparatus 4. Note that this specification shows an example in which the memory 7 is a chip separate from the image sensor device 5, but this example is not to prevent the memory 7 from being integrated in the same package with the image sensor device 5.

The monitor apparatus of a navigation system, for example, can also serve as the monitor apparatus 4. As shown in FIG. 1, the monitor apparatus 4 has a display portion 4a, and a touch panel 4b that is formed on the display portion 4a. The display portion 4a displays the display image VI provided by the camera module 1. As one example, the display portion 4a is configured by a liquid crystal display. The touch panel 4b is formed together with the display portion 4a, and is a pressure-sensitive or electrostatic instruction input device that can output a position touched by a finger or the like as location data.

The image sensor device 5 is provided with a controller 91 that controls various computing units and the like of the image sensor device 5. In FIG. 1, control targets other than the memory interface 6 are not shown, but it will be appreciated that the image sensor core 8, the function units including a data computing unit 92 in the ISP 9, the output interface 99, and the like are included in the control targets. Furthermore, the image sensor device 5 can communicate with various systems and sensors via an in-vehicle network denoted by the reference numeral 50 in FIG. 1. In this embodiment, a CAN (controller area network) 50 is given as an example of the in-vehicle network. A power steering system 31 and a braking system 37 are configured by an ECU (electronic control unit) as the core, which is configured by an electronic circuit such as a CPU as the core together with peripheral circuits.

The power steering system 31 is an EPS (electric power steering) system or SBW (steer-by-wire) system provided with an actuator 41 and a torque sensor 22. The braking system 37 is an electric braking system or BBW (brake-by-wire) system provided with an actuator 47 and a brake sensor 27 and having an ABS (anti lock braking system) that suppresses brake locking, a skid prevention device (ESC: electronic stability control) that suppresses vehicle skidding during cornering, braking assistance for increasing braking force, and the like.

In FIG. 1, a steering sensor 21, a wheel speed sensor 23, a shift lever switch 25, and an accelerator sensor 29 are connected to the CAN 50 as examples of the various sensors. The steering sensor 21 is a sensor that detects the steering amount (rotation angle) of the steering wheel, and is configured by, for example, a Hall element or the like. The camera module 1 forming the driving assist apparatus 10 can acquire the steering amount of a steering wheel 2 operated by the driver from the steering sensor 21. The wheel speed sensor 23 is a sensor that detects the rotation amount or number of rotations per unit of time of the wheels of the vehicle 90, and is configured by, for example, a Hall element or the like. The wheel speed sensor 23 may be provided in the braking system 37 in order to promptly detect brake locking, wheel idling, signs of skidding, and the like from differences in the rotation of the left and right wheels. In this case, the driving assist apparatus 10 acquires the information via the braking system 37. The brake sensor 27 is a sensor that detects the operation amount of a brake pedal. The shift lever switch 25 is a sensor or switch that detects the position of the shift lever, and is configured by a displacement sensor or the like. For example, the driving assist apparatus 10 can start assist control if the shift lever is set to reverse, and can end assist control if the shift lever is changed from reverse to a forward gear. Furthermore, the torque sensor 22 that detects operation torque applied to the steering wheel can also detect whether or not the driver is gripping the steering wheel.

Figure 3:
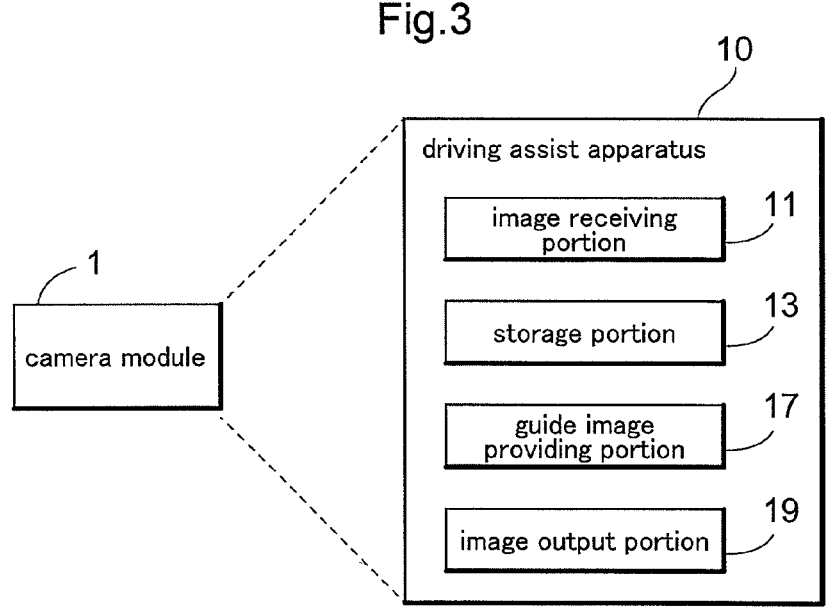
FIG. 3 is a block diagram schematically showing an exemplary functional configuration of a driving assist apparatus.

The driving assist apparatus 10 of the present invention is configured by the ISP 9 of the image sensor device 5 as the core in the camera module 1. As shown in FIG. 3, the driving assist apparatus 10 is configured including function units, namely an image receiving portion 11, a storage portion 13, a guide image providing portion 17, and an image output portion 19. These function units do not have to respectively have independent physical configurations, and it is sufficient that their functions are realized. That is to say, the function units may use common hardware, and their functions may be realized through the cooperation of software, such as programs and parameters, and hardware.

The image receiving portion 11 is a function unit that receives the captured image PI of the periphery of the vehicle 90, which has been captured by the vehicle-mounted camera 100, specifically, the optical unit 3 and the image sensor core 8. For example, the data computing unit 92 functions as the image receiving portion 11. The storage portion 13 is a function unit that stores graphics images for forming the guide display V. The memory 7 functions as the storage portion 13. The guide image providing portion 17 is a function unit that acquires a graphics image for forming the guide display V from the storage portion 13 (the memory 7) and provides it to the image output portion 19. The controller 91, a buffer 93, a decompression portion 94, an overlay portion 95, and the data computing unit 92 function as the guide image providing portion 17. The guide image providing portion 17 acquires a graphics image of the predicted course line C from the storage portion 13 according to an actual steering angle θ of the vehicle 90. Specifically, the guide image providing portion 17 acquires the steering angle θ of the vehicle 90 from the steering sensor 21, accesses the memory 7 based on an address specified according to the steering angle θ, and acquires a graphics image of the predicted course line C according to the steering angle θ. The image output portion 19 is a function unit that displays the display image VI on the monitor apparatus 4 inside the vehicle 90, the display image VI being an image obtained by superimposing the guide image GI using the guide display V on the captured image PI. The data computing unit 92 and the output interface 99 function as the image output portion 19.

Hereinafter, a description will be given with reference to an example of specific images shown in FIGS. 4 and 5. Note that the guide display V refers to a graphics image containing the guide line G for assisting the driver with a driving operation of the vehicle 90. The guide display V contains the guide line G, the fixed guide F, the vehicle extension line E, the message M, and the predicted course line C shown in FIG. 4. The guide line G is a guidance line for guiding the driver in order to assist the driver with a driving operation of the vehicle 90. The guide line G includes the vehicle extension line E and the predicted course line C. The vehicle extension line E in this example is a rearward vehicle width extension line obtained by extending the vehicle width of the vehicle 90 rearward. It will be appreciated that, if a vehicle extension line is superimposed on a captured image obtained by capturing an image of the area forward of the vehicle 90, the vehicle extension line E may be a forward vehicle width extension line. Furthermore, the vehicle extension line E is not limited to lines of the vehicle width, and may be extension lines of the axles in the fore-and-aft direction. Furthermore, the vehicle extension line E may be obtained by extending the front edge, the rear edge, the center in the vehicle length direction, of the like of the vehicle 90 in lateral directions of the vehicle 90. The position of the vehicle extension line E is determined based on the relationship between the vehicle 90 and the captured image PI that has been captured by the camera 100, and, thus, the vehicle extension line E is superimposed at a constant position in the captured image PI. Accordingly, the vehicle extension line E is contained in the fixed guide F. The fixed guide F also contains the message M.

Figure 5A:
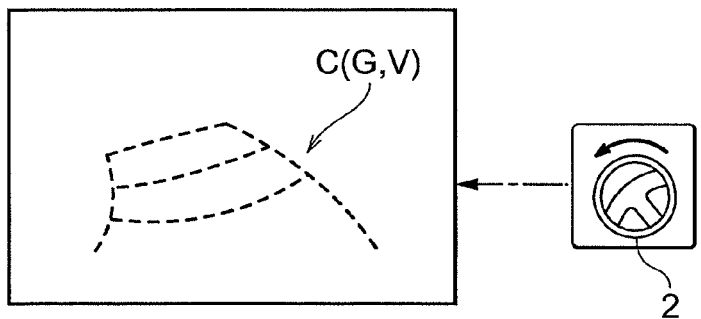
FIG. 5 is a diagram schematically showing a relationship between a steering wheel and a predicted course line.

The predicted course line C is the guide line G indicating a predicted course according to the actual steering angle of the vehicle 90 in the captured image PI. Accordingly, in the captured image PI, the predicted course line C is not superimposed at a constant position, but refers to a dynamic guide that changes according to the actual steering angle θ of the vehicle 90. As shown in FIG. 5C, when the steering wheel 2 is at a neutral position (center position), the steering angle θ is zero, and the predicted course line C is rendered at a position substantially overlapping the vehicle extension line E.

Figure 5B:
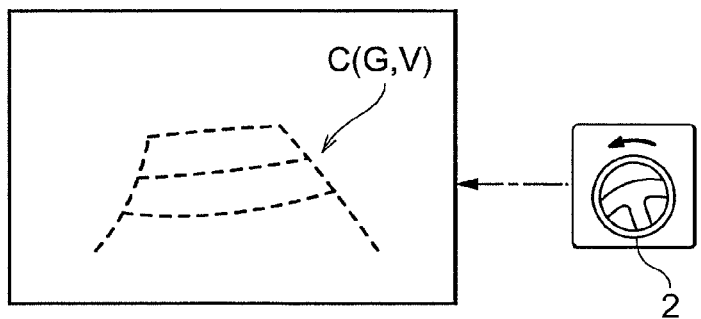
Figure 5C:
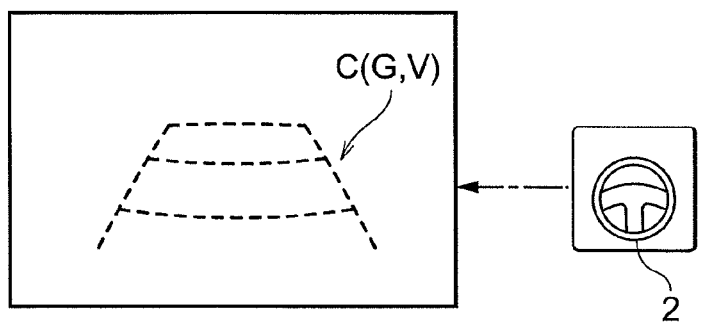

As shown in FIG. 5B, when the steering wheel 2 is operated slightly leftward from the neutral position, the predicted course line C is curved leftward. Note that, if the driver views the monitor apparatus 4 from the driver's seat as shown in FIG. 2, displaying scenes similar to those on a rear-view mirror (not shown) easily makes the driver to understand the situation surrounding the vehicle 90, and, thus, the display image VI displays the captured image PI as a mirror image in which left and right are reversed. Accordingly, the predicted course line C, which is to be superimposed on the captured image PI, is also rendered as a mirror image. As shown in FIG. 5A, when the steering wheel 2 is operated further leftward from the neutral position, the predicted course line C is curved leftward to a greater extent than in FIG. 5B.

Figure 5D:
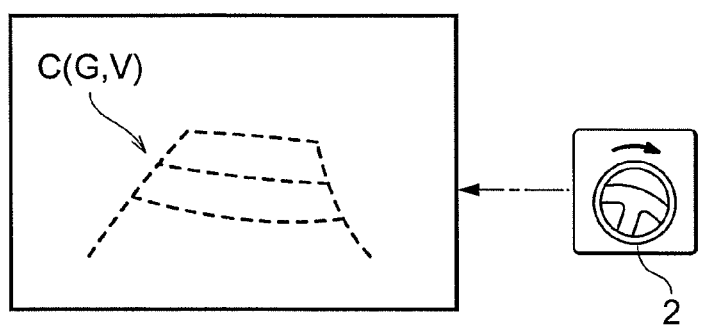
Figure 5E:
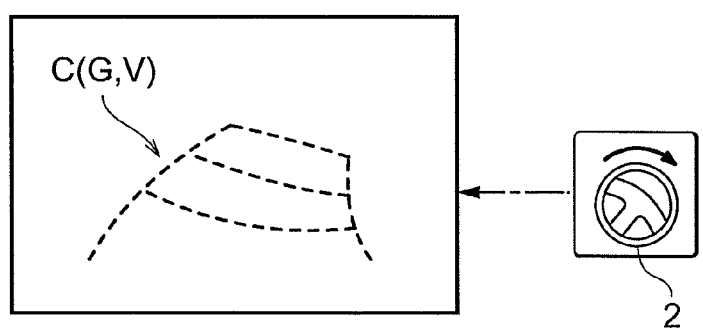

In a similar manner, as shown in FIG. 5D, when the steering wheel 2 is operated slightly rightward from the neutral position, the predicted course line C is curved rightward. Furthermore, as shown in FIG. 5E, when the steering wheel 2 is operated further rightward from the neutral position, the predicted course line C is curved rightward to a greater extent than in FIG. 5D.

Within a time during which the monitor apparatus 4 updates its screen, the guide image providing portion 17 configured by the ISP 9 as the core reads four types of guide displays from the memory 7, and superimposes them on the captured image PI, thereby generating the display image VI. Note that, if a video format that can be displayed on the monitor apparatus 4 does not match a video format of the captured image PI that has been captured by the camera 100 (or a video format of the display image VI), the captured image PI (the display image VI) cannot be displayed on the monitor apparatus 4. The video formats are defined by the number of horizontal and vertical pixels such as NTSC/PAL, the number of screens per unit of time (or screen frequency/ line frequency), the display method such as interlace/progressive, and the like. Accordingly, it can be said that, within a time during which the camera 100 captures the captured image PI for one screen, the guide image providing portion 17 reads four types of guide displays from the memory 7, and superimposes them on the captured image PI, thereby generating the display image VI, in synchronization with the capture cycle of the captured image PI for one screen (or the generation cycle of the display image VI).

For example, if the monitor apparatus 4 displays images at a frame rate of 30 fps, the guide image providing portion 17 generates the display image VI for one frame within 1/30 seconds (≈33 ms). In other words, the guide display V of a type processable by the guide image providing portion 17 in 1/30 seconds can be stored in the memory 7 as the storage portion 13. In this embodiment, the memory 7 can store four types of guide displays V indicated by OV1 to OV4. In this embodiment, a description will be given with reference to an example in which three types of guide displays V indicated by OV1 to OV3 are stored.

OV1 is a guide display V that corresponds to the vehicle extension line E, OV2 is a guide display V that corresponds to the predicted course line C, and OV3 corresponds to the message M. Note that the vehicle extension line E and the message M correspond to the fixed guide F, but the number of designs stored is not limited to one. For example, if it is determined that an obstacle is present near the vehicle 90 based on a detection result from a clearance sonar 33, the message M may be displayed in a different color. In this case, a guide display V stored as OV3 at a different address in the memory 7 is read. The same is applied to the vehicle extension line E.

The predicted course lines C having a different shape, for example, for every 15 degrees of the rotation angle of the steering wheel 2 are rendered in advance, and are respectively stored at different addresses of the memory 7. As shown in FIG. 4, the guide image providing portion 17 accesses the memory 7 based on an address A(θ) according to the steering angle θ indicated by the rotation angle of the steering wheel 2, the displacement angle of the wheels, or the like, and acquires the predicted course line C according to the steering angle θ. Furthermore, the guide image providing portion 17 acquires other guide displays V such as the vehicle extension line E or the message M as necessary from the memory 7 under the control of the controller 91.

In the description above, the guide displays V having a different shape for every predetermined steering angle, that is, for every 15 degrees of the rotation angle of the steering wheel 2 are rendered in advance and stored. However, the unit width of the predetermined steering angle, which is so-called resolution, may be different according to the position of the steering wheel 2. For example, the guide display V may be prepared and stored in the memory 7 such that the resolution when the steering wheel 2 is close to the neutral position is higher than that in the other regions when the steering wheel has been rotated. For example, the predicted course line C may be generated for every 5 or 10 degrees in the range close to the neutral position, where the rotation angle of the steering wheel 2 is not greater than 90 degrees in the left or right direction from the neutral position, and the predicted course line C may be generated for every 15 degrees in the range where the rotation angle of the steering wheel 2 is greater than 90 degrees in the left or right direction. With this configuration, the predicted course line C sensitively follows the operation from the neutral position for starting the steering, and, thus, the driver can be promptly notified of a change in the predicted course line C in the display image VI. Furthermore, the driver can recognize the movement of the predicted course line C at an early stage.

The guide displays V stored in the memory 7 are compressed in order to reduce the data volume. The guide displays V acquired from the memory 7 via the buffer 93, which is configured by a small-capacity memory, a register, or the like, are decompressed (expanded) by the decompression portion 94. Furthermore, if a plurality of guide displays V are superimposed on the captured image PI, the guide displays V after decompression are overlaid one on top of another so as to be merged into one guide image GI by the overlay portion 95. The guide image GI is overlaid on the captured image PI to form the display image VI by the data computing unit 92, and is output via the output interface 99 to the monitor apparatus 4.

As described above, the guide image providing portion 17 acquires a graphics image for forming the guide display V from the storage portion 13, and provides the guide image GI to the image output portion 19, in synchronization with the update cycle of the display image VI in the monitor apparatus 4. Accordingly, the ISP 9 acquires the steering angle θ as well from the steering sensor 21 in synchronization with the update cycle of the display image VI. The predicted course line C may be read each time from the memory 7 without any problem even if there is no change in the steering angle θ, or, although there is, the change is within the minimum resolution range of the steering angle θ. As a result, the same graphics image is read from the memory 7 as the predicted course line C, and the same guide image GI is provided to the image output portion 19. In this case, computation load is reduced because the processing is performed as a routine.

If the update cycle of the display image VI and the provision cycle of the guide image GI are synchronized with each other (e.g., if these cycles are the same cycle), the image output portion 19 can obtain a new guide image GI in each update cycle of the display image VI. Accordingly, since the guide image GI changes at the same speed as the captured image PI, with a simple configuration, the driver can be provided with visual effects completely similar to those in the case where the guide display V generated by computation is directly rendered in the captured image PI. Note that, if the change of the guide display V is to be performed at a low speed without any problem, the guide image may be provided in the cycle that is an integral multiple of the update cycle of the display image VI. Also in this case, there is no change in terms of being in synchronization with the update cycle of the display image VI. Note that, if the message M is required to blink in order to evoke the driver's attention, the blinking can be caused by thinning out the provision cycle of the message M on purpose in the update cycle.

When attaching the camera 100 to the vehicle 90, errors occur from an ideal attachment position or an ideal attachment posture. That is to say, the two-dimensional coordinate system projected on the captured image PI does not always match the designed ideal coordinate system. Errors between the actual coordinate system and the ideal coordinate system are roughly classified into two types. One of the types is a translational error in which the coordinate center (the intersection with an optical axis orthogonal to the projection face) of a two-dimensional projection face for forming the captured image PI is displaced from ideal coordinates in a three-dimensional world coordinate system. This is a position-related error in the optical system (the optical unit 3) occurring when attaching the camera 100 to the vehicle 90. The other type is a rotational error in which a two-dimensional projection face for forming the captured image PI is rotated, for example, about a rotational axis that is each axis of the three-dimensional orthogonal coordinates in a three-dimensional world coordinate system. This is a posture-related error in the optical system (the optical unit 3) occurring when attaching the vehicle-mounted camera 100 to the vehicle 90.

In order to suppress these errors, calibration is performed when the camera 100 is installed in the vehicle 90. Typically, with the calibration, calibration parameters for correcting the translational errors and the rotational errors are obtained, and the captured image PI is corrected based on these calibration parameters. It is assumed that, in this embodiment, correction parameters mainly for correcting the translational errors (position errors) and rotation parameters indicating the rotation errors (posture errors) are obtained through the calibration. The correction parameters for correcting the position errors are used to correct position-related errors in the optical system in the display image VI. Specifically, the correction parameters are such that displacement of the coordinates of an optical center or a predetermined reference point on a projection face of the optical center is defined with offset values on the respective two axes in a two-dimensional orthogonal coordinate system. Note that errors regarding pan (rotation in horizontal directions with respect to the screen) and tilt (rotation in perpendicular directions with respect to the screen), which are typically included in the rotational errors, are included in the position errors in this example, and are adjusted during adjustment of the position errors. Relatively high computation load is required in order to correct three-dimensional rotational errors on the projection face, which is a three-dimensional plane, using projective geometry. That is to say, high-load computation is required each time for the captured image PI. Accordingly, in this embodiment, the position errors are briefly corrected focusing on "appearance" in the projection face, which is an image on the screen of the monitor apparatus 4.

For example, a calibration indicator in which ideal coordinate values are prescribed is captured by the camera 100. Since ideal coordinate values are prescribed also for a reference point, which is a specific point in the calibration indicator, errors from the coordinates of the reference point in the actually captured image PI are obtained, and the offset values are determined. Specifically, the reference point in the calibration indicator set at a prescribed position in three dimensions is converted to ideal coordinate values in a captured image based on ideal conversion parameters. Then, differences between the actual coordinate values of the reference point in the captured image PI obtained by capturing this calibration indicator with the camera 100 and the ideal coordinate values are obtained, and are taken as errors. Based on these errors, the offset values are determined. Such offset values (correction parameters) are computed when installing the camera 100 in the vehicle, and are stored in the driving assist apparatus 10. In a similar manner, rotation parameters (described later) are also computed when installing the camera 100 in the vehicle, and are stored in the driving assist apparatus 10.

The guide display V has graphic information and reference coordinate position information, and is stored in the memory 7 (the storage portion 13). When constructing the guide image GI using the acquired guide display V, the guide image providing portion 17 performs offset adjustment on the reference coordinate position information using the correction parameters. This guide image GI is superimposed on the captured image PI and forms the display image VI, and, thus, position-related errors in the optical system are corrected in the display image VI. That is to say, position-related errors in the optical system are effortlessly adjusted without performing complicated computation such as coordinate transformation.

As described above, errors regarding pan (rotation in horizontal directions with respect to the screen) and tilt (rotation in perpendicular directions with respect to the screen), which are typically included in the rotational errors, are included in the position errors in this example, and are adjusted during adjustment of the position errors. Roll (rotation of the screen), which is the remaining factor of the rotational errors, is corrected as described below. That is to say, the rotational errors are corrected, taking the rotation angle of the actually captured image PI with respect to the ideal state of the captured image PI as rotation-related errors in the optical system occurring when attaching the camera 100 to the vehicle 90.

Typically, coordinate transformation is necessary for correcting rotational errors. The coordinate transformation imposes high computation load. Thus, rotational errors are adjusted in this example through the cooperation of the storage portion 13 and the guide image providing portion 17. The storage portion 13 stores the guide display V that has been generated in advance for every predetermined value of rotation-related errors in the optical system, and the guide image providing portion 17 acquires the guide display V to which an adjustment amount has been added based on the rotation parameters indicating the rotational errors.

Figure 6:
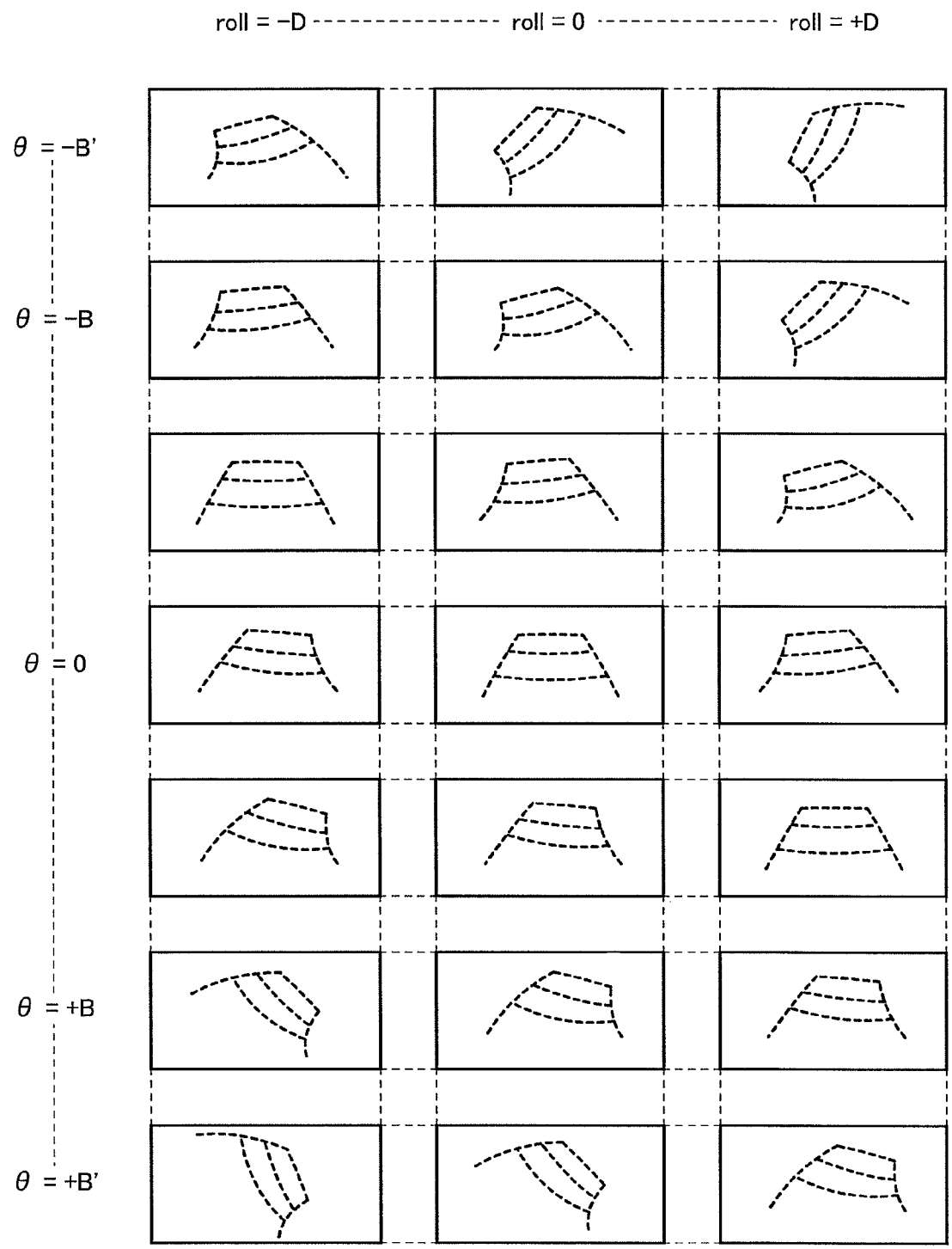
FIG. 6 is a diagram schematically showing an exemplary data format of a memory that stores graphics images corresponding to rotational errors.

Specifically, as shown in FIG. 6, the storage portion 13 stores the graphics images indicating the guide displays V according to the rotation parameter roll value of the optical system regarding the rotation and value of the steering angle $\theta$ of the vehicle 90. Note that, although FIG. 6 shows an example in which two series of graphics images with the roll value being D in opposite rotational directions have been added, the total number of series of graphics images is not limited to three. It will be appreciated that more series may be prepared and stored according to the roll value within the range of the capacity of the memory 7. Note that the steering angle $\theta=\pm B$ in FIG. 6 refers to the designed maximum rotation angle of the steering wheel 2. In consideration of individual errors of the vehicles 90 or the steering wheels 2, the graphics images are prepared and stored according to the steering angle $\theta$ having an absolute value of B', which is larger than B, with a certain margin from the maximum rotation angle B. The guide image providing portion 17 accesses an address $(A(\theta, \text{roll}))$ of the memory 7 (the storage portion 13) that is determined based on the rotation parameter roll (error in the optical system) and the steering angle $\theta$, and acquires the guide display V to which an adjustment amount has been added.

The capacity of the memory 7 may be insufficient for further preparation and storage of graphics images for every predetermined value of rotational errors, with respect to the predicted course lines C having a large number of graphics images stored for every predetermined value of the steering angle $\theta$. Thus, in order to save the capacity of the memory 7, the following method is also preferable. There is a correspondence between the rotational error and the steering angle $\theta$. For example, if there is a rotational error, the predicted course line C is displayed at a position displaced by a predetermined steering angle according to the rotational error. Focusing on this aspect, the steering angle θ or the referenced address A(θ) in the memory 7 based on the steering angle θ is adjusted according to the rotational error.

Figure 7:
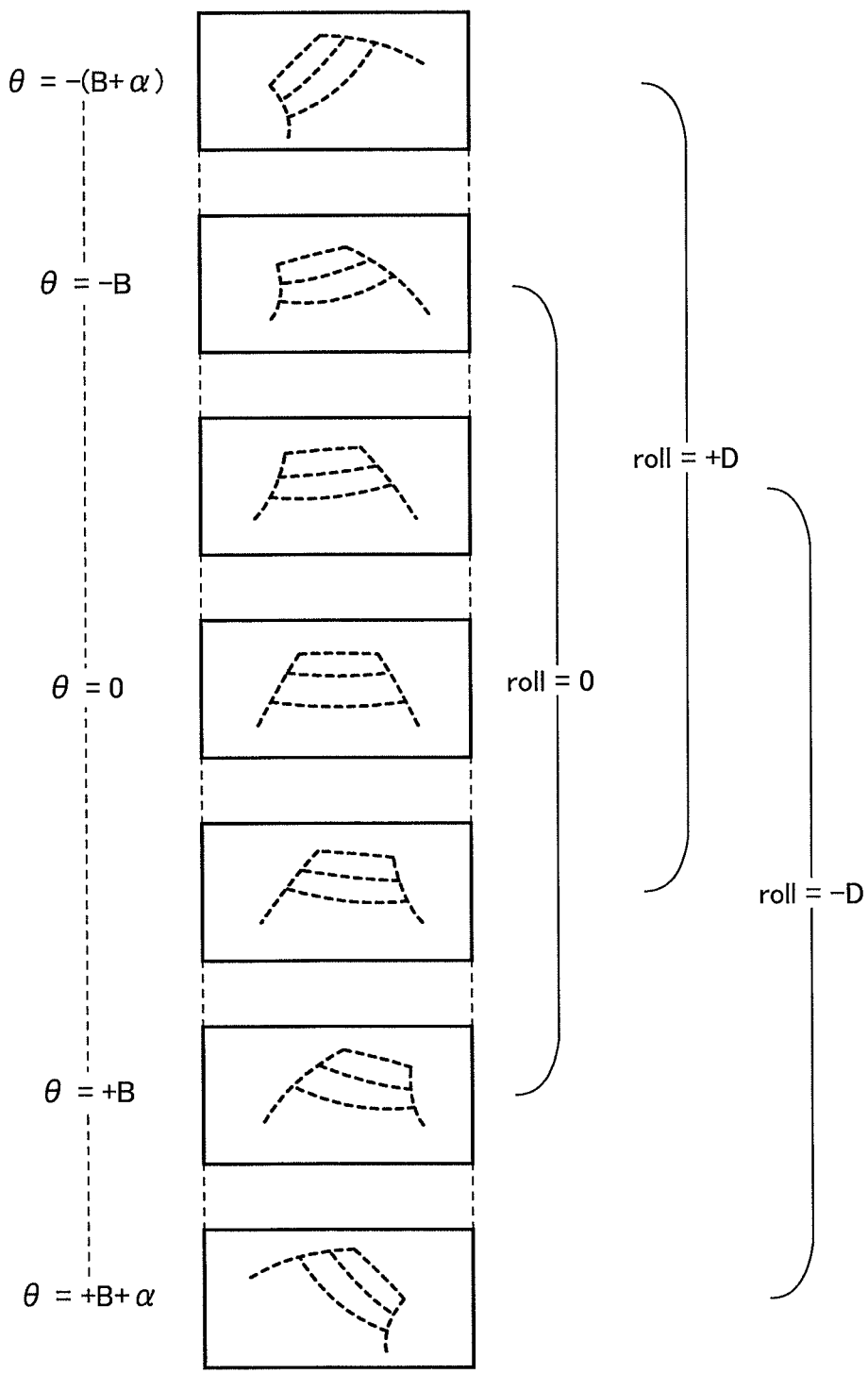
FIG. 7 is diagram schematically showing another exemplary data format of a memory that stores graphics images corresponding to rotational errors.

Specifically, as shown in FIG. 7, the storage portion 13 stores the graphics images of the predicted course lines C over a variable range that is wider than the variable range of the actual steering angle θ. The variable range of the steering angle θ is set such that its absolute value can be larger by a than the maximum rotation angle B. Preferably, this absolute value (B+α) is larger than B', which is obtained by adding a certain margin to the absolute value B of the maximum rotation angle of the steering angle θ described above with reference to FIG. 6, because graphics images up to the maximum rotation angle are reliably prepared according to the rotation parameter roll. The guide image providing portion 17 corrects the actual steering angle θ, for example, to θ' based on the rotation parameter indicating the error in the optical system regarding the actual steering angle θ of the vehicle 90 and the actual rotation of the camera 100. The guide image providing portion 17 acquires the predicted course line C from the storage portion 13 according to the corrected value θ'. Since the storage portion 13 stores graphics images of the predicted course lines C over a variable range that is wider than the variable range of the actual steering angle θ, value of the steering angle may be corrected based on the rotation parameter without any problem. It will be appreciated that the steering angle θ may not be corrected, and, instead, the address A(θ) obtained with the steering angle θ may be corrected according to the rotation parameter roll, thereby obtaining the address A'(θ) and reading the guide display V from the memory 7.

In the description above, errors regarding pan and tilt, which have been included in the rotational errors, are included in the position errors (translational errors), and are corrected by performing the offset adjustment, and errors regarding roll are corrected by adjusting the referenced address in the memory. However, there is no limitation to this method, and pan and tilt may be included in the rotational errors and corrected. In this case, only the translational errors correspond to the position errors. Furthermore, the rotation parameters contain adjustment values for adjusting errors in rotational factors about three axes, namely pan, tilt, and roll.

As described above, the rotation parameters are computed in production plants or the like when installing the camera 100 in the vehicle, and are stored in the driving assist apparatus 10. Specifically, a plurality of calibration indicators in which ideal coordinate values are prescribed are captured by the camera 100, and the rotation parameters are computed from ideal coordinate values of reference points, which are specific points in the respective calibration indicators, and coordinate values in the actually captured image PI. As an approach for obtaining such rotation parameters, various approaches are known such as that disclosed in JP 2001-245326A, and, thus, a detailed description thereof has been omitted.

The driving assist apparatus 10 corrects (generates) the guide images GI based on the stored rotation parameters, and stores the corrected guide displays V in the storage portion 13. That is to say, the guide displays V in which rotational errors in the optical system have been adjusted are stored in advance. At that time, if the capacity of the storage portion 13 (the memory 7) allows, both the non-adjusted initial guide display and the corrected guide display are preferably stored. Even when the rotation parameters are changed by maintenance, a new corrected guide display can be generated and stored based on the non-adjusted initial guide display and the latest rotation parameter. Note that the method for generating the corrected guide display V is not limited to the above-described method for correcting the non-adjusted initial guide display based on the latest rotation parameter. For example, it is also conceivable to directly generate the guide display V, without the non-adjusted initial guide display, by performing computation based on the latest rotation parameter, the preset installing position of the camera 100, and the like. In that case, the installing position of the camera 100 refers to, for example, the height from the road, the distance from the center in the lateral direction (offset position in the lateral direction), the distance from the rear wheel shaft, or the like.

Hereinafter, the method for correcting the non-adjusted initial guide based on the latest rotation parameter will be summarized. The guide display V may be stored as follows. That is to say, errors between ideal coordinates of a reference point in the two-dimensional coordinate system of the captured image PI and actual coordinates are taken as position-related errors in the optical system occurring when attaching the camera 100 to the vehicle 90. Furthermore, the rotation angle of the captured image PI with respect to the ideal state of the captured image PI is taken as rotation-related errors in the optical system occurring when attaching the camera 100 to the vehicle 90. These rotation-related errors are errors between an ideal angle of a coordinate axis in the two-dimensional coordinate system of the captured image PI and an actual angle, and can be taken as posture-related errors in the optical system occurring when attaching the camera 100 to the vehicle 90. The storage portion 13 stores in advance the corrected guide displays V that have been corrected based on the rotation parameters indicating the rotation-related errors in the optical system occurring when attaching the camera 100. The guide image providing portion 17 corrects the position of the guide displays V in the display image VI based on the correction parameters for correcting the position-related errors in the optical system in the display image VI.

In this example, the guide displays V are corrected based on the rotation parameters and are stored in advance, but this example is not to prevent the guide displays V corrected based on not only the rotation errors but also the position errors from being generated and stored. That is to say, the storage portion 13 may store in advance the corrected guide displays V that have been corrected based on the rotation parameters indicating the rotation-related errors in the optical system and the correction parameters (translational parameters) indicating the position-related errors in the optical system occurring when attaching the camera 100. In this case, the guide image providing portion 17 does not correct the guide display V regarding the errors in the optical system, but, instead, acquires the predicted course line C as the corrected guide display V from the storage portion 13 according to the actual steering angle of the vehicle 90, forms the guide image GI using the acquired guide display V, and provides it to the image output portion 19.

Note that the guide images GI may be corrected not by the driving assist apparatus 10 but by an external apparatus (not shown) outside the vehicle 90 capable of being connected to the network of the vehicle 90 such as the CAN 50. In this case, the corrected guide displays V are downloaded via this network to the storage portion 13 (the memory 7), and are stored in advance in the storage portion 13. Alternatively, the corrected guide displays V may be stored in a memory card or the like without being downloaded, and this memory card may be set in the vehicle 90. It will be appreciated that the storage portion 13 (the memory 7) itself may be configured as a memory card, and the memory card may be once removed from the vehicle 90 and set in an external apparatus where the corrected guide displays V are provided, after which the memory card may be returned to the vehicle 90. With use of a storage medium such as a memory card, even if the communication speed of the in-vehicle network such as the CAN 50 is low, the guide displays V can be easily corrected and stored again. It will be appreciated that parameters necessary for correcting the guide displays V such as rotation parameters and correction parameters (translational parameters) also may be transmitted via a memory card to an external apparatus.

In this embodiment, a description was given using, as an example, a driving assist apparatus in which a series of processing that captures the captured image PI, superimposes the guide image GI on the captured image PI, and then outputs the thus obtained display image VI is comprehensively performed by the integrated camera module 1. However, the present invention is not limited to such an integrated driving assist apparatus. The system may be configured by an independent camera, and an image processing apparatus that receives the captured image PI from the camera, causes an ECU configured by a CPU or a DSP as the core to superimpose the guide image GI thereon, and outputs the display image VI.

Figure 8:
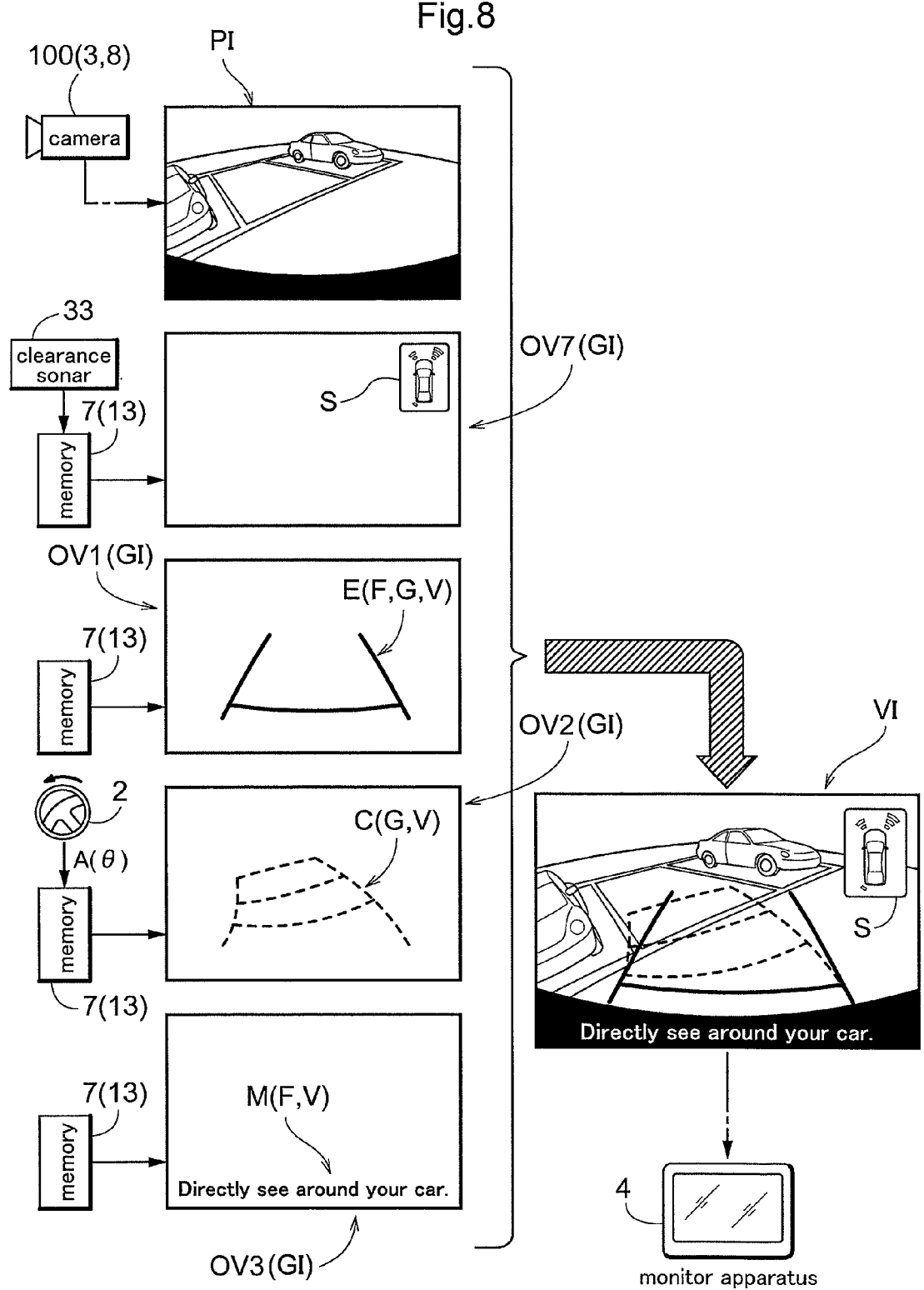
FIG. 8 is a diagram schematically showing a relationship between a captured image, guide images, and a display image according to another embodiment.

In the foregoing embodiment, the display image VI is generated by superimposing the guide image GI containing the guide display V on the captured image PI. However, the application range of the present invention is not limited to this. The display image VI may be generated by further superimposing a guide image GI containing surrounding information S. FIG. 8 shows an example of such a display image VI.

The vehicle 90 is provided with an object detecting portion that detects an object around the vehicle 90. Examples of the object detecting portion include the clearance sonar 33. It will be appreciated that a millimeter wave radar or the like may be used instead of the clearance sonar 33. In this embodiment, a description will be given assuming that the clearance sonars 33 are arranged at four corners (right front, left front, right rear, and left rear) of the vehicle.

Figure 9:
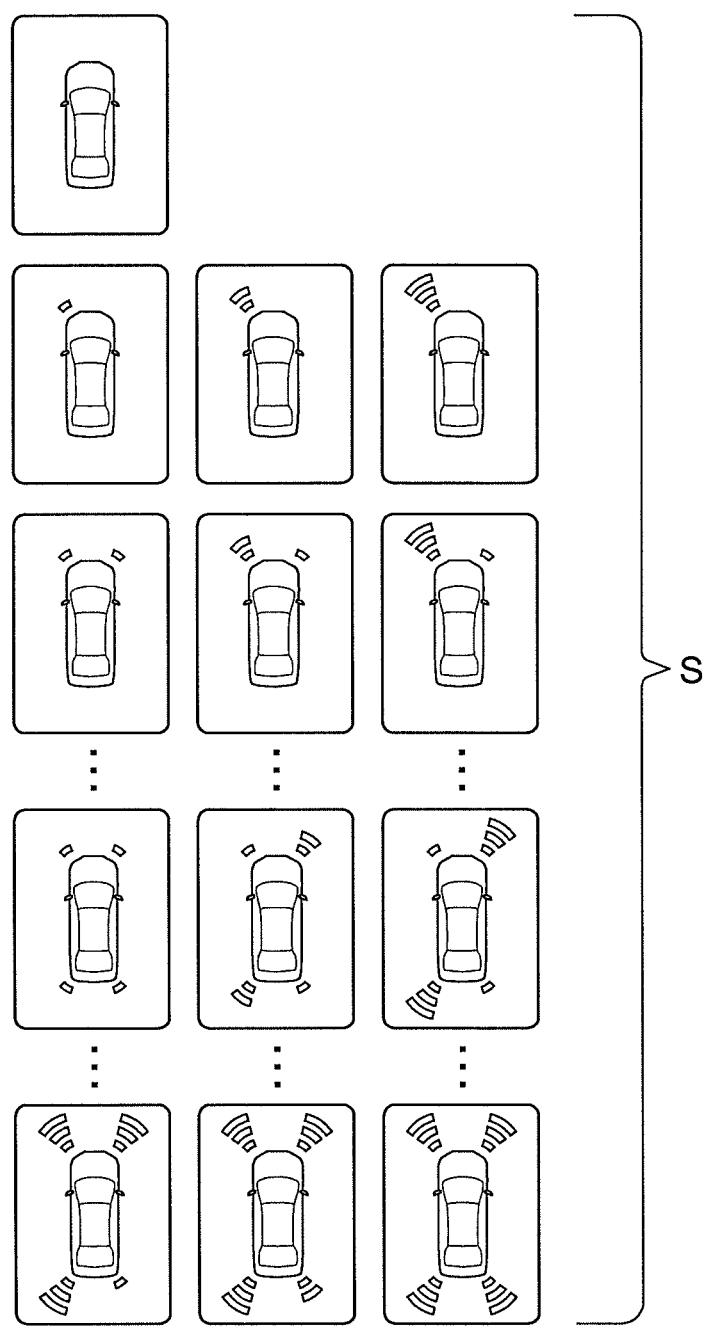
FIG. 9 is diagram schematically showing an exemplary data format of a memory that stores graphics images corresponding to surrounding information.

Furthermore, as the surrounding information S indicating the situation surrounding the vehicle 90, the storage portion 13 stores a plurality of pieces of surrounding information S that have been generated in advance as graphics images respectively for distances and directions from the vehicle 90 to an object. In this embodiment, the surrounding information S refers to information indicating whether or not an object is present around the vehicle 90. Furthermore, the distance from the vehicle 90 to an object is displayed, for example, in three stages according to the distance. Furthermore, the detection direction corresponds to each of the above-described four corners, namely the right front direction, the left front direction, the right rear direction, and the left rear direction from the vehicle 90. The surrounding information S is stored in the storage portion 13 as a plurality of graphics images respectively for these distances and directions. FIG. 9 shows an example thereof.

The guide image providing portion 17 acquires the surrounding information S from the storage portion 13 based on a detection result from the clearance sonars 33, performs merging the same into the guide image, and provides the merged image to the image output portion 19. The guide image providing portion 17 acquires, together with the guide image GI, the surrounding information S corresponding to the detection result from the clearance sonars 33, from the storage portion 13. The guide image GI is acquired as in the foregoing embodiment, and, thus, a description thereof has been omitted. FIG. 8 shows an example in which the guide images GI containing three types of guide displays V indicated by OV1 to OV3 and the guide image GI containing the surrounding information S indicated by OV7 are superimposed on the captured image PI. The example shown in FIG. 8 shows the surrounding information S in the case where objects are detected respectively on the right front side, the left front side, and the left rear side of the vehicle 90. Furthermore, the surrounding information S is prescribed according to the distance from the vehicle 90 to an object. In particular, in the example shown in FIG. 8, an object is detected at a position relatively close to the vehicle 90 on the right front side, and another object is detected at a position more away therefrom on the left front side. Furthermore, another object is detected also at a position relatively away therefrom on the left rear side.

In the example shown in FIG. 8, the surrounding information S is merged in an upper portion in the guide image GI. Accordingly, the surrounding information S can be arranged in an unnecessary region in the upper portion in the captured image PI. Thus, a region indicating the situation surrounding the vehicle 90 (e.g., a region requiring attention), which is contained in the captured image PI, is not interrupted.

It will be appreciated that the surrounding information S may be merged in a lower portion in the guide image GI. Accordingly, the surrounding information S can be arranged in an unnecessary region such as the body of the vehicle 90, which is in many cases contained in the lower portion in the captured image PI. Thus, a region indicating the situation surrounding the vehicle 90 (e.g., a region requiring attention), which is contained in the captured image PI, is not interrupted.

Note that, as the information contained in the guide image GI that is to be superimposed on the captured image PI, the surrounding information S may be replaced by information detected by other detection means, such as that indicating the fuel level or the door being open. In this case, the vehicle 90 may be configured including a vehicle information acquiring portion that acquires information on the vehicle 90, wherein the storage portion 13 stores, as vehicle information indicating the information on the vehicle 90, a plurality of pieces of vehicle information that have been generated in advance as graphics images, and the guide image providing portion 17 acquires the vehicle information from the storage portion 13 based on a detection result from the vehicle information acquiring portion, performs merging the same into the guide image GI, and provides the merged image to the image output portion 19.

Furthermore, the surrounding information S may be indicated by a specific numerical value (e.g., "OO meters"), or may be displayed with an indicator having a predetermined unit width.

Although not described above, the display image VI as shown in FIG. 4 is preferably configured such that the guide image GI for OV3, the guide image GI for OV2, and the guide image GI for OV1 are overlaid in this order from the lower layer side on the captured image PI. It will be appreciated that the display image VI may be configured such that the guide image GI for OV3, the guide image GI for OV2, and the guide image GI for OV1 are overlaid in different orders on the captured image PI.

Furthermore, the display image VI as shown in FIG. 8 is preferably configured such that the guide image GI for OV3, the guide image GI for OV2, the guide image GI for OV1, and the guide image GI for OV7 are overlaid in this order from the lower layer side on the captured image PI. It will be appreciated that the display image VI may be configured such that the guide image GI for OV3, the guide image GI for OV2, and the guide image GI for OV1 are overlaid in different orders on the captured image PI, and the guide image GI for OV7 is overlaid on the uppermost layer.

INDUSTRIAL APPLICABILITY

The present invention can be applied to a driving assist apparatus that eases the driver's operational burden by superimposing a guide image on an image captured by a vehicle-mounted camera, with a simple system configuration.

LIST OF REFERENCE NUMERALS

1 Camera module (vehicle-mounted camera module)
2 Steering wheel
3 Optical unit
4 Monitor apparatus (display apparatus)
5 Image sensor device
7 Memory
8 Image sensor core
9 Image sensor processor
10 Driving assist apparatus
11 Image receiving portion
13 Storage portion
17 Guide image providing portion
19 Image output portion
81 Image sensor
82 Analog circuit (signal processing portion)
83 A/D converter (signal processing portion)
90 Vehicle
100 Camera (vehicle-mounted camera)
C Predicted course line
E Vehicle extension line
F Fixed guide
G Guide line
GI Guide image
PI Captured image
S Surrounding information
V Guide display
VI Display image
θ Steering angle
roll Rotation parameter

The invention claimed is:

1. A driving assist apparatus, comprising:
an image receiving portion that receives a captured image of a periphery of a vehicle, captured by a vehicle-mounted camera;
an image output portion that displays, on a display apparatus inside the vehicle, a display image formed by superimposing a guide image on the captured image, the guide image being configured by a guide display using a graphics image containing a guide line for assisting a driver with a driving operation of the vehicle;
a storage portion that stores, as the guide display, at least a plurality of predicted course lines that have been generated in advance as graphics images for every predetermined steering angle, the predicted course lines each being the guide line for assisting the driving operation by showing a predicted course according to an actual steering angle of the vehicle in the captured image; and
a guide image providing portion that at least acquires the predicted course line as the guide display from the storage portion according to an actual steering angle of the vehicle using offset values on respective two axes in a two-dimensional orthogonal coordinate system, forms the guide image using the acquired guide display, and provides the formed image to the image output portion,
the offset values on the respective two axes in the two-dimensional orthogonal coordinate system being computed based on a difference between actual coordinate values in the captured image and ideal coordinate values, the difference being obtained based on a rotation parameter of the vehicle-mounted camera according to an attachment position of the vehicle-mounted camera,
wherein a rotation angle of the captured image with respect to an ideal state of the captured image is taken as a rotation-related error in an optical system occurring when attaching the vehicle-mounted camera to the vehicle,
the storage portion further stores graphics images showing the guide displays according to a steering angle of the vehicle, according to the rotation-related error in the optical system, and
the guide image providing portion acquires the graphics image of the predicted course line from the storage portion according to an actual steering angle of the vehicle and a rotation parameter indicating the rotation-related error in the optical system occurring when attaching the vehicle-mounted camera to the vehicle.

2. The driving assist apparatus according to claim 1, wherein the guide image providing portion acquires the guide display from the storage portion in synchronization with a capture cycle of the captured image or an update cycle of the display image on the display apparatus, and provides the guide image to the image output portion.

3. The driving assist apparatus according to claim 1,
wherein an error between ideal coordinates of a reference point in a two-dimensional coordinate system of the captured image and actual coordinates is taken as a position-related error in an optical system occurring when attaching the vehicle-mounted camera to the vehicle, and
the guide image providing portion corrects a position of the guide display in the display image based on a correction parameter for correcting the position-related error in the optical system in the display image.

4. The driving assist apparatus according to claim 1, wherein the graphics images of the predicted course lines stored in the storage portion are generated such that the predetermined steering angle when a steering wheel of the vehicle is close to a neutral position is smaller than that when the steering wheel has been rotated.

5. The driving assist apparatus according to claim 1,
wherein, in the captured image, the guide display that is displayed at a predetermined position on a display screen regardless of an actual steering angle of the vehicle is taken as a fixed guide,
the storage portion further stores at least one said fixed guide, and
the guide image providing portion acquires the predicted course line and the fixed guide from the storage portion, performs merging the same into one said guide image, and provides the guide image to the image output portion.

6. The driving assist apparatus according to claim 5, wherein the fixed guide includes a vehicle extension line as the guide line indicating an extension line of the vehicle in a travel direction at a predetermined steering angle, regardless of an actual steering angle of the vehicle, in the captured image.

7. The driving assist apparatus according to claim 1, configured by an integrated vehicle-mounted camera module comprising:
- an image sensor device provided with
  - an image sensor core having an image sensor that performs photoelectric conversion to convert a scene in a periphery of the vehicle into an analog image signal, and a signal processing portion that performs signal processing on the analog image signal to generate the captured image composed of a digital image signal, and
  - an image sensor processor that at least generates the guide image by acquiring the guide display containing the predicted course line from the storage portion, generates the display image by superimposing the captured image and the guide image, and outputs the display image;
- an optical unit that forms an image of the scene in the periphery of the vehicle on a light-receiving face of the image sensor; and
- a memory that stores the graphics images of the guide displays.

8. The driving assist apparatus according to claim 1,
- wherein the vehicle is provided with an object detecting portion that detects an object around the vehicle,
- the storage portion stores a plurality of pieces of surrounding information that have been generated in advance as graphics images respectively for distances and directions from the vehicle to the object, the surrounding information indicating a situation surrounding the vehicle, and
- the guide image providing portion acquires the surrounding information from the storage portion based on a detection result from the object detecting portion, performs merging the same into the guide image, and provides the guide image to the image output portion.

9. The driving assist apparatus according to claim 8, wherein the surrounding information is merged in an upper portion in the guide image.

10. The driving assist apparatus according to claim 8, wherein the surrounding information is merged in a lower portion in the guide image.

11. A driving assist apparatus, comprising:
- an image receiving portion that receives a captured image of a periphery of a vehicle, captured by a vehicle-mounted camera;
- an image output portion that displays, on a display apparatus inside the vehicle, a display image formed by superimposing a guide image on the captured image, the guide image being configured by a guide display using a graphics image containing a guide line for assisting a driver with a driving operation of the vehicle;
- a storage portion that stores, as the guide display, at least a plurality of predicted course lines that have been generated in advance as graphics images for every predetermined steering angle, the predicted course lines each being the guide line for assisting the driving operation by showing a predicted course according to an actual steering angle of the vehicle in the captured image; and
- a guide image providing portion that at least acquires the predicted course line as the guide display from the storage portion according to an actual steering angle of the vehicle using offset values on respective two axes in a two-dimensional orthogonal coordinate system, forms the guide image using the acquired guide display, and provides the formed image to the image output portion, the offset values on the respective two axes in the two-dimensional orthogonal coordinate system being computed based on a difference between actual coordinate values in the captured image and ideal coordinate values, the difference being obtained based on a rotation parameter of the vehicle-mounted camera according to an attachment position of the vehicle-mounted camera,
- wherein a rotation angle of the captured image with respect to an ideal state of the captured image is taken as a rotation-related error in an optical system occurring when attaching the vehicle-mounted camera to the vehicle,
- the storage portion stores the graphics images of the predicted course lines over a variable range that is wider than a variable range of an actual steering angle, and
- the guide image providing portion corrects an actual value of the steering angle based on an actual steering angle of the vehicle and a rotation parameter indicating the actual rotation-related error in the optical system, and acquires the predicted course line from the storage portion according to the corrected value.

12. The driving assist apparatus according to claim 11, wherein the guide image providing portion acquires the guide display from the storage portion in synchronization with a capture cycle of the captured image or an update cycle of the display image on the display apparatus, and provides the guide image to the image output portion.

13. The driving assist apparatus according to claim 11,
- wherein an error between ideal coordinates of a reference point in a two-dimensional coordinate system of the captured image and actual coordinates is taken as a position-related error in an optical system occurring when attaching the vehicle-mounted camera to the vehicle, and
- the guide image providing portion corrects a position of the guide display in the display image based on a correction parameter for correcting the position-related error in the optical system in the display image.

14. The driving assist apparatus according to claim 11, wherein the graphics images of the predicted course lines stored in the storage portion are generated such that the predetermined steering angle when a steering wheel of the vehicle is close to a neutral position is smaller than that when the steering wheel has been rotated.

15. The driving assist apparatus according to claim 11,
- wherein, in the captured image, the guide display that is displayed at a predetermined position on a display screen regardless of an actual steering angle of the vehicle is taken as a fixed guide,
- the storage portion further stores at least one said fixed guide, and
- the guide image providing portion acquires the predicted course line and the fixed guide from the storage portion, performs merging the same into one said guide image, and provides the guide image to the image output portion.

16. The driving assist apparatus according to claim 15, wherein the fixed guide includes a vehicle extension line as the guide line indicating an extension line of the vehicle in a travel direction at a predetermined steering angle, regardless of an actual steering angle of the vehicle, in the captured image.

17. The driving assist apparatus according to claim 11, configured by an integrated vehicle-mounted camera module comprising:

an image sensor device provided with
  an image sensor core having an image sensor that performs photoelectric conversion to convert a scene in a periphery of the vehicle into an analog image signal, and a signal processing portion that performs signal processing on the analog image signal to generate the captured image composed of a digital image signal, and
  an image sensor processor that at least generates the guide image by acquiring the guide display containing the predicted course line from the storage portion, generates the display image by superimposing the captured image and the guide image, and outputs the display image;
an optical unit that forms an image of the scene in the periphery of the vehicle on a light-receiving face of the image sensor; and
a memory that stores the graphics images of the guide displays.

18. The driving assist apparatus according to claim 11, wherein the vehicle is provided with an object detecting portion that detects an object around the vehicle,
the storage portion stores a plurality of pieces of surrounding information that have been generated in advance as graphics images respectively for distances and directions from the vehicle to the object, the surrounding information indicating a situation surrounding the vehicle, and
the guide image providing portion acquires the surrounding information from the storage portion based on a detection result from the object detecting portion, performs merging the same into the guide image, and provides the guide image to the image output portion.

19. The driving assist apparatus according to claim 18, wherein the surrounding information is merged in an upper portion in the guide image.

20. The driving assist apparatus according to claim 18, wherein the surrounding information is merged in a lower portion in the guide image.

* * * * *

UNITED STATES PATENT AND TRADEMARK OFFICE
CERTIFICATE OF CORRECTION

PATENT NO. : 9,294,733 B2
APPLICATION NO. : 13/817670
DATED : March 22, 2016
INVENTOR(S) : Kazuya Watanabe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 386 days.

Signed and Sealed this
Twenty-sixth Day of July, 2016

Michelle K. Lee
*Director of the United States Patent and Trademark Office*